Dec. 1, 1964 R. J. RAHN 3,159,469
GRADIENT TEMPERATURE NORMALIZER FOR SURFACE PLATES OR BLOCKS
Filed Oct. 4, 1961
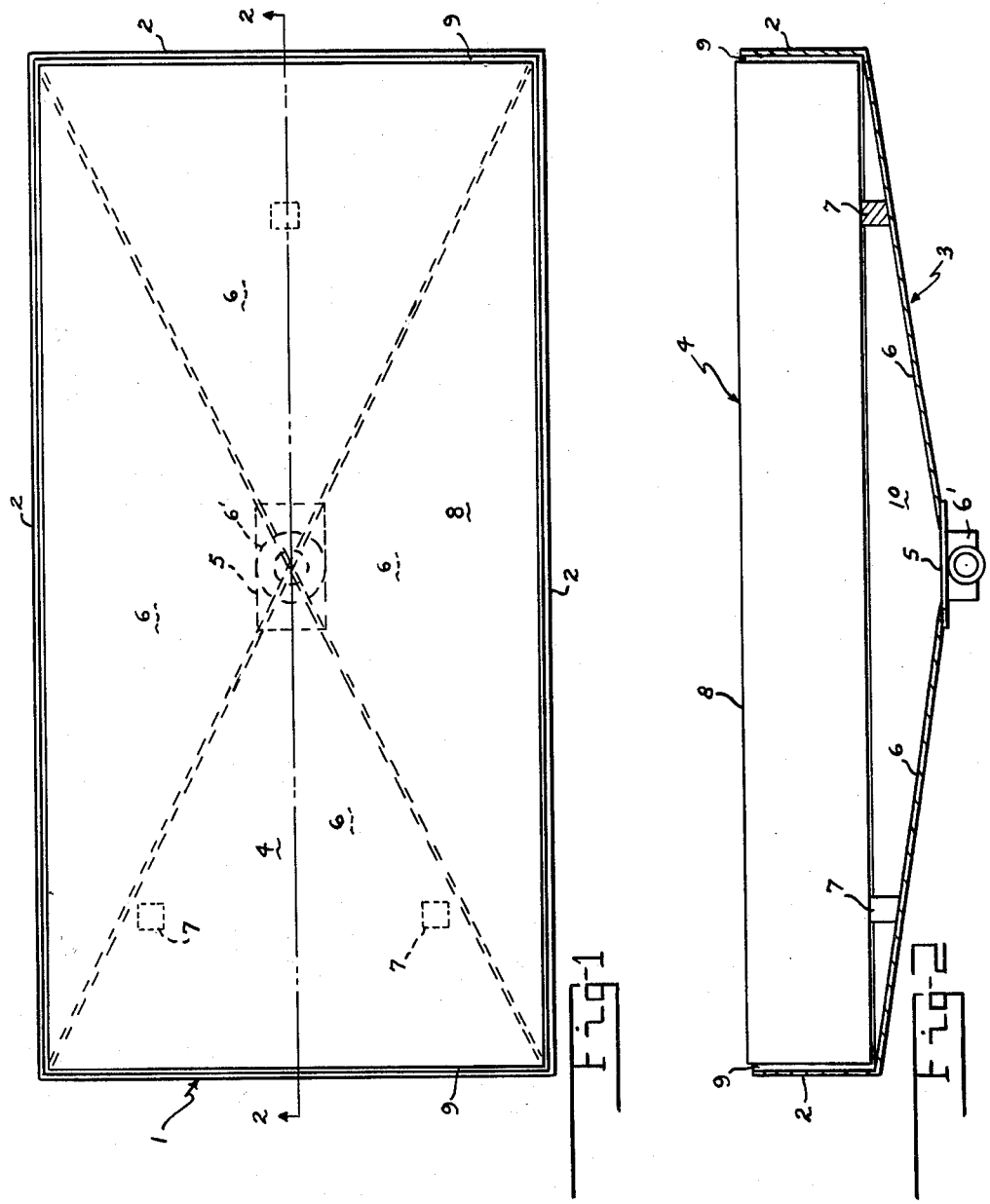
INVENTOR.
RUDOLPH J. RAHN
BY
ATTORNEY

3,159,469
GRADIENT TEMPERATURE NORMALIZER FOR SURFACE PLATES OR BLOCKS
Rudolph J. Rahn, Dayton, Ohio, assignor to Rahn Granite Surface Plate Company, Dayton, Ohio, a partnership
Filed Oct. 4, 1961, Ser. No. 142,965
3 Claims. (Cl. 34—243)

This invention relates to a novel surface plate assembly and more particularly to apparatus for normalizing surface plates and minimizing the usual effect thereon of changing gradient temperatures. Surface plates are thereby rendered more efficient and satisfactory in use.

Surface plates are generally made of steel. Currently, the most accurate plates are made of granite. When made of either material, they will distort upon being subjected to changes in temperature, particularly changes in gradient temperature, and such changes occur quite frequently. For example, in the winter time there may be a relatively large heat input to the room where they are located. When this occurs the room temperature at higher elevations will become higher than the temperature at lower elevations. Since a surface plate is relatively thick, its upper surface which is at one elevation will become warmer than its lower surface which is at another elevation. This causes the plate to bow and affects its precision characteristics. For accuracy in its use, the plate must be reworked to eliminate the bow. In contrast, in the summer time, and particularly when cooling equipment is used, there is little change in room temperature and very little difference in temperature at various elevations. Thus, in the summer time, the upper and lower plate surfaces will be subject to nearly the same temperature. If the reworked plate above described were to be subjected to a summer environment where the temperature gradient is very small or zero, it would inherently bow in the opposite direction.

Thus, it can be seen that the effects of changes in gradient temperature on surface plates are serious in that they inherently tend to destroy the high precison characteristics normally built into surface plates. This is particularly objectionable in instances, which are now quite frequent, where extremely precise measurements must be made which necessitate the use of high precision surface plates.

The present invention provides an optimum solution to the problems above indicated with reference to surface plates. Its embodiment provides apparatus for nesting a surface plate which enables a substantially uniform temperature to be maintained about its exterior at all times, irrespective of temperature changes to which it might be subjected. The effects of gradient temperatures are thereby normalized or eliminated.

A primary object of the invention is to provide apparatus particularly applicable for maintaining the exterior of a surface plate at a generally uniform temperature which is economical to fabricate, efficient and satisfactory in use, adaptable to a wide variety of applications, and unlikely to malfunction.

A further object of the invention is to enable a novel mount for a surface plate which will insure maximum accuracy in use thereof.

Another object of the invention is to provide means for inducing uniform application of temperature changes over the exterior of a surface plate.

A further object of the invention is to provide a novel device for normalizing gradient temperatures in surface plates and the like.

An additional object of the invention is to provide a novel surface plate assembly consisting of a surface plate embodied in a receptacle including means for preventing its distortion when located in an area of changing temperatures.

A further object of the invention is to provide apparatus enabling a novel surface plate assembly possessing the advantageous structural features, the inherent meritorious characteristics and the means and mode of operation herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a plan view of an assembly incorporating a surface plate in accordance with the invention; and FIG. 2 is an elevation view thereof.

Like parts are indicated by similar characters of reference throughout the several views.

The invention can be best described with particular reference to the accompanying drawings.

The device for normalizing gradient temperatures in surface plates in the example illustrated includes a tray 1 consisting of four side sections 2 of equal and generally uniform depth and a bottom section 3. The side sections 2 are integrally connected to form a rectangle, the internal dimensions of which are slightly greater than the peripheral dimensions of the rectangular surface plate 4 which is to be nested therein. As may be seen from the drawings, the bottom section 3 is centrally depressed. The shape of the bottom section is such that it consists of four generally triangular portions 6, the bases of which integrally connect to and are coextensive with the bottoms of the respective side sections 2. From the sides 2, the portions 6 are joined and uniformly and equally sloped downwardly to their apex portions which are truncated to mutually define a central aperture 5.

Shown generally schematically in the drawings is an exhaust fan 6' connected to depend from the bottom section 3 of the tray 1 at its center. The intake opening to the fan 6' is aligned and coextensive with the opening to the tray 1 through the aperture 5. Suitable support may be provided for the tray 1 such as might fit its intended application. However, details thereof are not shown since they form no particular part of the present invention.

As may be seen from the drawings, the rectangular surface plate 4 is applied to the tray 1 to complete the surface plate assembly in accordance with the invention. Support elements 7 are triangularly positioned on and projected upwardly from the bottom of the tray 1 to mount the plate 4 in elevated relation therein so its top or operating surface 8 lies in a plane slightly higher than the plane defined by the uppermost edges of the side sections 2 of the tray 1.

The internal dimension of the rectangle defined by the sides 2, as previously mentioned, are arranged to be slightly greater than the peripheral dimensions of the plate 4. The plate 4 is thus nested in the tray 1 with its sides uniformly and closely spaced with reference to the side sections 2. In this manner a generally uniform space 9 is provided about the periphery of the plate 4 which is defined by the sides 2 which are closely adjacent. The elevation of the plate with reference to the bottom of the tray provides an air space 10 at its bottom. The space 10 is simultaneously in communication with the air space or passage 9 about the plate 4 as well as the exhaust fan 6' through the aperture 5 in the bottom of tray 1.

As above described, substantially the entire surface of the sides as well as the bottom of the surface plate 4 is essentially encased in a cover provided by the tray 1. It should be noted that the tray is preferably but not necessarily made of material with a low rate of heat transmission. As the plate 4 is nested, this cover extends almost but not quite to its top surface 8 so the entrance to the passage 9 about the plate 4 is immediately adjacent the surface 8. For this reason, on energizing the fan 6', air is drawn from an elevation immediately adjacent the exposed surface 8 of the plate 4 down about its sides through the passage or air space 9 and over its bottom in the space 10 to flow out through the aperture 5. Suitable baffles may be provided in conjunction with the fan at the bottom of the tray to insure a fairly uniform amount of air to enter the space or passage 9 immediately adjacent the plate surface 8 and to flow over its bottom. Absolute uniformity of flow is not required since with the arrangement provided there can be sufficient intake of air at the temperature of the exposed surface 8 of the plate 4 that air at essentially the same temperature will be moved over the sides and bottom of the surface plate as above described. The amount of air exhausted by the fan 6' is such that the intake of air through the passage 9 is at a fairly low velocity so that there will be no suction to cause air at a substantially higher elevation than surface 8 to enter the passage 9.

Thus, by maintaining the flow of air from an elevation adjacent the top of the surface plate 4, as provided by the invention, regardless of the temperature of the room in which the surface plate is used which produces a particular temperature at the exposed surface 8, the top and bottom of the plate 4 will be subjected to practically the same temperature. It may be readily seen that the problems of changing gradient temperatures within a surface plate due to changes in temperatures to which the plate is subjected are eliminated thereby. As provided, when a surface plate is subjected to any temperature change, the complete exterior thereof will be subjected to the same temperature change. In this manner any inadvertent surface expansion or contraction that would distort the operating surface of a surface plate is prevented. The invention thus nullifies the normal undesirable effects of changing gradient temperature variations thereon. It enables surface plates to be maintained in optimum condition and highly precise measurements to be obtained in their use, with a degree of accuracy beyond that previously possible. The advantages thereof appear obvious.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In combination, a surface plate at least one surface of which is formed as a reference plane for critical measurement of mechanical parts, a tray including sides and a bottom, means nesting said plate in said tray to expose said one surface of said plate in slightly elevated relation to said tray, said plate having the sides thereof in slightly spaced relation to the sides of said tray and its bottom spaced from the bottom of said tray, means connected at the bottom of said tray to apply a suction in said tray in a manner to draw air from an elevation substantially corresponding to that of said one surface of said plate and cause air from that elevation to flow directly about the plate sides and bottom whereby, in any one instant, to subject all surfaces of said plate to substantially the same temperature.

2. In combination, a surface plate, a casing for said plate arranged to expose the upper surface of said plate, said casing being formed to have its sides generally uniformly and closely spaced from the lateral sides of said plate but slightly below said upper surface of said plate and to provide a chamber adjacent the surface of said plate opposite said upper surface and means connected to said casing to draw air from a plane generally common to that of said exposed plate surface and cause the air to move about the plate sides and said opposite plate surface whereby, in any one instant, to provide a substantially uniform air temperature about said plate.

3. In combination, a surface plate at least one surface of which is formed as a reference plane for critical measurement of mechanical parts, means defining a casing for said surface plate exposing at least a portion of said one surface and forming with said plate a chamber adjacent the opposite surface of said plate, said casing being otherwise in closely spaced relation to adjacent portions of said plate, the top edge of said casing being slightly below said one surface, and means in connection with said casing and the chamber formed thereby for inducing air flow from a plane adjacent the exposed surface portion of said plate to move between said casing and said plate and to flow over the surface of said plate which forms with said casing said chamber whereby, in any one instant, to subject the entire surface of said plate to substantially the same temperature.

References Cited in the file of this patent

UNITED STATES PATENTS

| Re. 5,658 | Burns | Nov. 18, 1873 |
| 43,530 | Stillman | July 12, 1864 |
| 787,438 | Cutler | Apr. 18, 1905 |
| 1,605,839 | Herman | Nov. 2, 1926 |
| 2,229,760 | Mueller | Jan. 28, 1941 |
| 2,352,957 | Kell | July 4, 1944 |

OTHER REFERENCES

"The Optician," March 8, 1957, page 195, vol. 133, No. 3440.